United States Patent [19]

Wight et al.

[11] Patent Number: 4,927,982

[45] Date of Patent: May 22, 1990

[54] WIRE CHANNEL BUSHING AND ELECTRICAL ENCLOSURES COUPLED THEREWITH

[75] Inventors: Donald C. Wight, Marysville; Keith T. Krueger, Bellefontaine, both of Ohio

[73] Assignee: Siemens Energy & Automation, Inc., Atlanta, Ga.

[21] Appl. No.: 334,965

[22] Filed: Apr. 7, 1989

[51] Int. Cl.$^5$ .............................................. H02G 3/08
[52] U.S. Cl. ........................................ 174/50; 174/51; 174/152 R; 277/166; 285/19
[58] Field of Search ..................... 174/51, 142, 152 R, 174/152 G, 167, 18, 50, 52.1; 361/356, 357, 358, 364, 365, 369; 285/19, 20, 48, 50, 188, 189, 201, 205, 363, 368; 277/166, 180, 181; 220/3.2, 3.92, 3.94

[56] References Cited

U.S. PATENT DOCUMENTS

| | | | |
|---|---|---|---|
| 1,744,706 | 1/1930 | Hanny | 174/50 X |
| 1,955,106 | 4/1934 | Von Normann | 285/19 |
| 1,980,335 | 11/1934 | Hewitt et al. | 277/166 X |
| 2,072,862 | 3/1937 | Balfe | 285/50 X |
| 2,078,920 | 5/1937 | Abbott | 361/365 X |
| 2,850,064 | 9/1958 | Rapata | 277/166 X |
| 3,481,633 | 12/1969 | Schonholzer | 285/363 X |

FOREIGN PATENT DOCUMENTS

| | | | |
|---|---|---|---|
| 1335646 | 7/1963 | France | 220/3.94 |
| 913988 | 12/1962 | United Kingdom | 174/152 R |

Primary Examiner—Laramie E. Askin
Attorney, Agent, or Firm—James G. Morrow; Lawrence C. Edelman

[57] ABSTRACT

A wire channel bushing mountable between two electrical enclosure boxes. The bushing provides a rain-tight channel for wires passing between the boxes and also provides reliable grounding paths for grounding one box to the other.

5 Claims, 3 Drawing Sheets

WIRE CHANNEL BUSHING AND ELECTRICAL ENCLOSURES COUPLED THEREWITH

BACKGROUND OF THE INVENTION

The invention relates to the passage of wires between two electrical enclosures, and, in particular, to an apparatus through which wires can pass, wherein the apparatus is coupled between at least two enclosures such that the connection is water-tight, and proper grounding is achieved between the enclosures.

In many geographical areas utilities are required to provide a separate enclosure (pull box) to terminate their service entrance wires. With this arrangement, a second enclosure (disconnect enclosure) must be provided for the service disconnect. The problem with this arrangement is that wires must be channeled between the pull box and the disconnect box if the service disconnect is to be coupled to the termination within the pull box. Certain electrical standards require that wire channels between these types of boxes be rain-tight. Additionally, it is important to protect the wires by avoiding sharp edges at the ends of the channel, and to provide proper grounding between the pull box and the disconnect box via the channel.

One solution to this problem is to provide a conduit between the pull box and the disconnect box. While this solution may provide for sufficient grounding, wire protection, and weatherproofing; this solution requires a relatively expensive conduit, a relatively large space to couple the conduit to both boxes in a satisfactory manner, and a relatively large amount of labor to couple the conduit to the boxes.

SUMMARY OF THE INVENTION

An object of the present invention is to provide an inexpensive apparatus which can be coupled between at least two enclosures such that a water tight wire channel and a reliable ground path is provided between the enclosures.

Accordingly, the present invention provides for an apparatus for providing a channel between electrical enclosures. The apparatus includes a bushing member and means for providing an electrically conductive path between the sides of the bushing member. The bushing member includes a channel passing through the member between the sides, and is fabricated from an insulating material.

An advantage of the present invention is that it can provide a channel between two enclosures which is simple to install between the enclosures. Another advantage of the present invention is that it provides a relatively short path through which wires must be passed to go from one enclosure to the other enclosure. Still another advantage of the present invention is that it provides a wire channel which has edges at its entrance and exit which help reduce damage to the insulation of wires pulled through the channel.

Various other objects and advantages will become apparent from the following description, with reference to the drawings.

DETAILED DESCRIPTION OF THE PREFERRED EMBODIMENT

Figure 1:
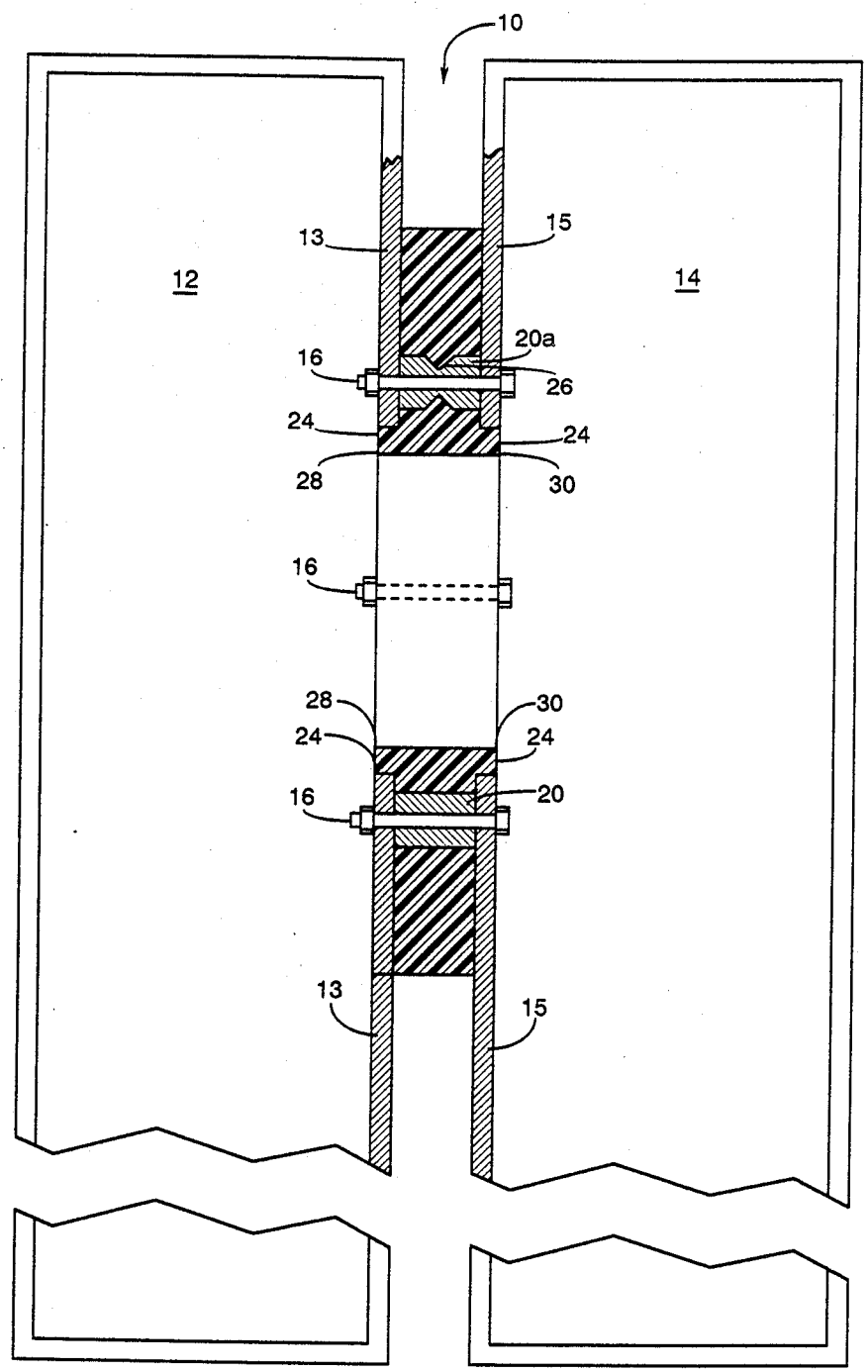
FIG. 1 illustrates two enclosures having a wire channel bushing coupled between the enclosures.
Figure 2:
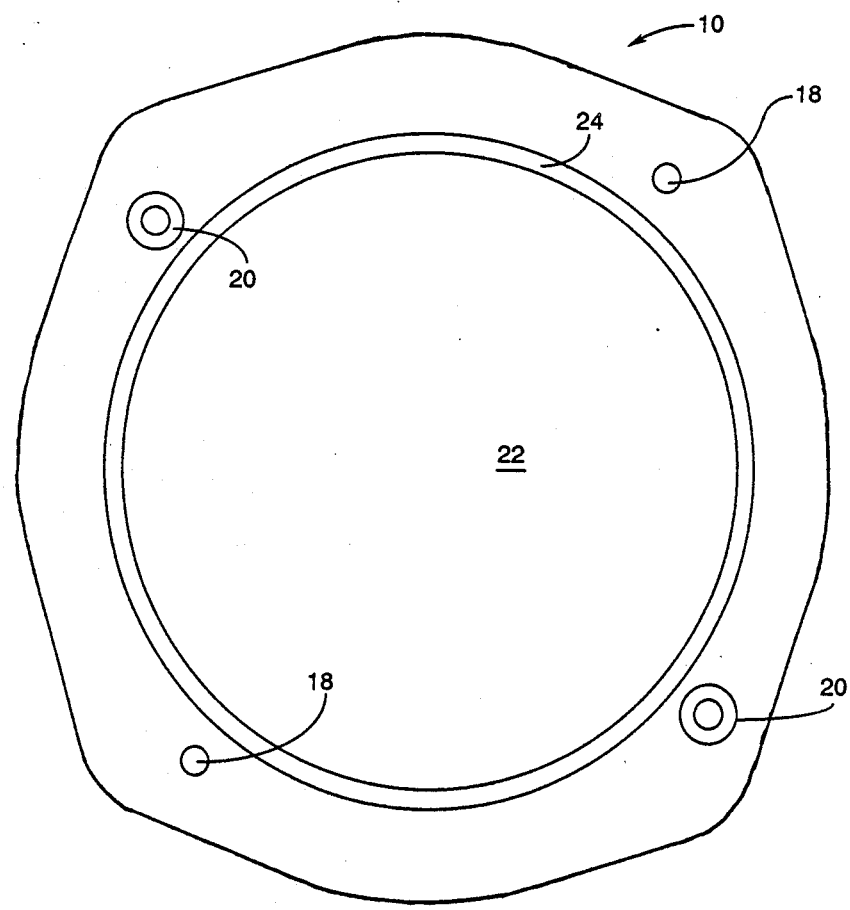
FIG. 2 is a plan view of the wire channel bushing.
Figure 3:
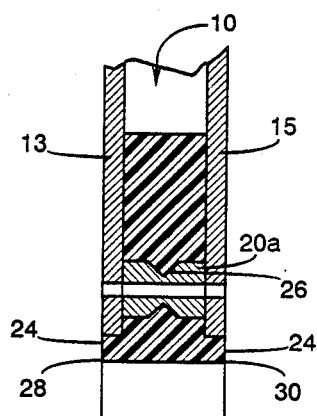
FIG. 3 is a sectional view of the wire channel bushing.
Figure 4:
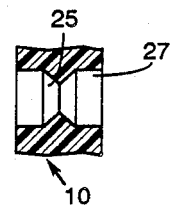
FIG. 4 is an enlarged sectional view of an opening in the wire channel.

Referring now to FIGS. 1-3, a bushing 10 is coupled between a first enclosure 12, which could function as a pull box, and a second enclosure 14, which could function as a disconnect box. The bushing 10 is fixed between respective walls 13, 15 of enclosures 12 and with four bolts 16. Two of the bolts 16 pass through mounting holes 18 (See FIG. 2) in the bushing 10, and two of the bolts 16 pass through respective sleeves 20 in the bushing 10. To provide proper electrical contact between the sidewalls 13, 15 and the sleeves 20, the bolts 16 passing through the sleeves 20 are tightened so that the bushing 10 and sleeves 20 are clamped between the sidewalls 13, 15. This arrangement provides for at least two reliable grounding paths when the sleeves 20 contact non-painted areas on the sidewalls 13, 15. Additionally, this arrangement provides a water-tight wire channel between the enclosures 12, 14.

Figure 5A:
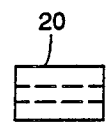
FIGS. 5a and 5b illustrate two embodiments of a grounding sleeve.

FIG. 5a illustrates a first embodiment of the sleeves 20. This b of the sleeves 20 provides for a generally tubular-shaped element including a center opening through which a bolt 16 can pass. The sleeves 20 are pressed into the openings 27 of the bushing 10 such that an interference fit between the sleeve 20 and opening 27 is achieved. A circumferential lip 25 within the opening 27 assists in providing the interference fit.

Figure 5B:
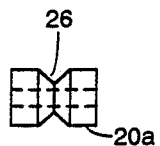

FIG. 5b illustrates a second embodiment of the sleeves, designated 20a. In this embodiment, the sleeves 20a are provided with means in the form of circumferential grooves 26 which function to fix the sleeves 20a within the bushing 10. By way of example, the bushing 10 can be fabricated from a polyester glass reinforced molding compound. Accordingly, if the bushing 10 is molded with the sleeves 20a in place, the bushing compound is forced to occupy the grooves 26 and fix the sleeves 20a within the bushing 10. Additionally, the sleeves 20a can be pressed into the openings 27 such that the lip 25 engages the groove 26.

By way of example, the sleeves 20 and 20a are fabricated from a conductive material such as aluminum so that the enclosures 12, 14 can be adequately grounded to each other.

The bushing 10 is also provided with two shoulders 24 which are concentric with the circular opening 22 in the bushing 10. These shoulders 24 serve to position the bushing 10 within the openings in the sidewalls 13, 15 of the enclosures 12, 14. Since the bushings 10 are normally fabricated from a polyester material, or other relatively pliable insulating material, the edges 28, 30 at the entrance and exit of the opening 22 do not damage the insulation on wires pulled through the opening 22 between the enclosures 12, 14.

While one embodiment of a wire channel bushing has been shown and described in detail herein, various changes and modifications may be made to adapt the assembly for use in various assemblies. For example, the sleeves could be fabricated from suitable conductive material other than aluminum. Furthermore, one or more of the sleeves could be configured to include a shape different from the two embodiments disclosed, and the lip could also be configured differently.

We claim:

1. An apparatus for providing a channel between electrical enclosures, the apparatus comprising:

an insulating bushing member having first and second ends, a side wall spanning therebetween, a generally circular channel passing from the first end to the second end through the bushing member, a first shoulder bordering the channel at the first end, a second shoulder bordering the channel at the second end, and at least one mounting hole in the bushing member for mounting the bushing member between the enclosures; and at least two conductive sleeves being generally cylindrical and including an opening adapted to accept a fastener, the sleeves being carried by the bushing member exteriorly of the channel and in spaced relation to the mounting hole for providing grounding paths between the electrical enclosures, the sleeves extending from the first end through the bushing member to the second end;

wherein the electrical enclosures each include a wall having an opening, and each shoulder is adapted to extend into one opening.

2. The apparatus of claim 1, wherein the bushing member is molded from an insulating material and each sleeve further includes means for fixing the sleeve in the insulating material.

3. The apparatus of claim 1, wherein each sleeve includes a groove extending circumferentially about the sleeve for fixing the sleeves in the bushing member.

4. An electrical enclosure assembly comprising:

a pull box including a first wall having a first opening;

a termination box including a second wall having a second opening;

an insulating bushing fixed between the first wall and the second wall such that a channel is provided between the first opening and the second opening, the insulating bushing including a first shoulder bordering the channel and extending into the first opening, and a second shoulder bordering the channel and extending into the second opening;

a plurality of fasteners fixing the insulating bushing between the first wall and the second wall; and at least two conductive sleeves being generally cylindrical and including an opening adapted to accept a fastener, the sleeves being carried by the insulating bushing exteriorly of the channel and in spaced relation to the fasteners, the sleeves extending from the first wall to the second wall for providing grounding between the pull box and the termination box.

5. The assembly of claim 4, wherein the insulating bushing is molded from an insulating material and each sleeve includes a groove extending circumferentially about the sleeve for fixing the sleeve in the insulating material.

* * * * *